United States Patent
Koo et al.

(10) Patent No.: US 11,812,022 B2
(45) Date of Patent: Nov. 7, 2023

(54) BDPCM-BASED IMAGE CODING METHOD AND DEVICE THEREFOR

(71) Applicant: LG ELECTRONICS INC., Seoul (KR)

(72) Inventors: Moonmo Koo, Seoul (KR); Jaehyun Lim, Seoul (KR); Junghak Nam, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/890,991

(22) Filed: Aug. 18, 2022

(65) Prior Publication Data

US 2022/0400265 A1 Dec. 15, 2022

Related U.S. Application Data

(63) Continuation of application No. 17/501,885, filed on Oct. 14, 2021, now Pat. No. 11,470,320, which is a
(Continued)

(51) Int. Cl.
*H04N 19/124* (2014.01)
*H04N 19/132* (2014.01)
(Continued)

(52) U.S. Cl.
CPC ......... *H04N 19/124* (2014.11); *H04N 19/132* (2014.11); *H04N 19/159* (2014.11);
(Continued)

(58) Field of Classification Search
CPC .. H04N 19/124; H04N 19/132; H04N 19/159; H04N 19/176; H04N 19/18;
(Continued)

(56) References Cited

U.S. PATENT DOCUMENTS 9,826,230 B2   11/2017  Lim ..................... H04N 19/593
9,877,035 B2    1/2018  Zou ..................... H04N 19/197
(Continued)

FOREIGN PATENT DOCUMENTS

KR   10-2016-0135756 A   11/2016
KR   10-2018-0024702 A    3/2018
(Continued)

OTHER PUBLICATIONS

Marta Karczewicz et al., "CE-8-Related Residual BDPCM"; JVET-N0413, Geneva, CH, Mar. 19-27, 2019 (Year: 2019).*
(Continued)

*Primary Examiner* — Dramos Kalapodas
(74) *Attorney, Agent, or Firm* — Bryan Cave Leighton Paisner LLP

(57) ABSTRACT

An image decoding method according to the present document comprises the steps of: deriving a quantized transform coefficient for a current block on the basis of BDPCM; deriving a transform coefficient by performing dequantization on the quantized transform coefficient; and deriving a residual sample on the basis of the transform coefficient, wherein, when the BDPCM is applied to the current block, inverse non-separable transform is not applied to the transform coefficient.

13 Claims, 11 Drawing Sheets

Related U.S. Application Data continuation of application No. PCT/KR2020/005216, filed on Apr. 20, 2020.

(60) Provisional application No. 62/836,656, filed on Apr. 20, 2019.

(51) Int. Cl.
| | |
|---|---|
| *H04N 19/159* | (2014.01) |
| *H04N 19/176* | (2014.01) |
| *H04N 19/18* | (2014.01) |
| *H04N 19/186* | (2014.01) |
| *H04N 19/46* | (2014.01) |

(52) U.S. Cl.
CPC .......... *H04N 19/176* (2014.11); *H04N 19/18* (2014.11); *H04N 19/186* (2014.11); *H04N 19/46* (2014.11)

(58) Field of Classification Search
CPC ...... H04N 19/186; H04N 19/46; H04N 19/12; H04N 19/157; H04N 19/60; H04N 19/70
See application file for complete search history.

(56) References Cited

U.S. PATENT DOCUMENTS

| | | | | |
|---|---|---|---|---|
| 2014/0286412 | A1 | 9/2014 | Joshi | H04N 19/593 |
| | | | | 375/240.12 |
| 2014/0286413 | A1 | 9/2014 | Joshi | H04N 19/593 |
| | | | | 375/240.12 |
| 2014/0362917 | A1 | 12/2014 | Joshi | H04N 19/129 |
| | | | | 375/240.12 |
| 2015/0264354 | A1 | 9/2015 | Zhang | H04N 19/102 |
| | | | | 375/240.03 |
| 2015/0264364 | A1 | 9/2015 | Zhang | H04N 19/12 |
| | | | | 375/240.18 |
| 2015/0264376 | A1* | 9/2015 | Zou | H04N 19/463 |
| | | | | 375/240.03 |
| 2017/0374369 | A1* | 12/2017 | Chuang | H04N 19/593 |
| 2018/0249165 | A1 | 8/2018 | Lim | H04N 19/157 |
| 2020/0077101 | A1 | 3/2020 | Lim | H04N 19/176 |
| 2020/0260070 | A1 | 8/2020 | Yoo | H04N 19/103 |
| 2020/0329257 | A1* | 10/2020 | Zhao | H04N 19/615 |
| 2021/0297685 | A1* | 9/2021 | Karczewicz | H04N 19/157 |
| 2021/0306666 | A1 | 9/2021 | Lee | H04N 19/105 |

FOREIGN PATENT DOCUMENTS

| | | | | |
|---|---|---|---|---|
| KR | 20160111417 | A | 3/2018 | ........... H04N 19/109 |
| KR | 20180024702 | A | 3/2018 | |
| KR | 101845622 | B1 | 4/2018 | |
| KR | 10-2019-0021478 | A | 3/2019 | |
| RU | 2016147170 | A | 7/2018 | ............. H04N 19/00 |
| RU | 2016147170 | A | 7/2018 | |
| RU | 2018114880 | A | 3/2019 | ........... H04N 19/103 |
| RU | 2018114880 | A | 3/2019 | |

OTHER PUBLICATIONS

Mohsen Abdoli et al., "AHG11: Block BDPCM for Screen Content Coding"; JVET-L0078, Macao, CN, Oct. 3-12, 2018 (Year: 2018).

Wei Pu et al., "Palette Mode Coding in HEVC Screen Content Coding Extension" ; (c) 2016 IEEE, 2156-3357 (Year: 2016).

Wei pu et al., Palette Mode Codingin HEVC Screen Content Coding Extension, IEE Journal on Emerging and Selected Topics in Circuits and Systems, vol. 6, No. 4, Dec. 2016, pp. 420-432.

Marta Karczewicz et al., "CE8-related: Quantized residual BDPCM", JVET-N0413, Joint Video Experts Team (JVET) of ITU-T SG 16 WP 3 and ISO/IEC JTC 1/SC 29/WG 11, 14th Meeting: Geneva, CH, Mar. 19-27, 2019, see pp. 1-2.

Mohsen Abdoli et al., "AHG11: Block DPCM for Screen Content Coding", JVET-L0078, Joint Video Experts Team (JVET) of ITU-T SG 16 WP 3 and ISO/IEC JTC 1/SC 29/WG 11, 12th Meeting: Macao, CN, Oct. 3-12, 2018, see pp. 1-2.

B. Bross et al., "Versatile Video Coding (Draft 4)", Joint Video Experts Team (JVET) of ITU-T SG 16 WP 3 and ISO/IEC JTC 1/SC 29/WG 11, Jan. 9-18, 2019, JVET-M1001-v6.

B. Bross et al., "Non-CE8: Unified Transform Type Signalling and Residual Coding for Transform Skip", Joint Video Experts Team (JVET) of ITU-T SG 16 WP 3 and ISO/IEC JTC 1/SC 29/WG 11, Jan. 9-18, 2019, JVET-M0464-v4.

G. Clare et al., "CE8: BDPCM with harmonized residual coding and CCB limitation (CE8-3.1a, CE8-3.1b, CE8-5.1a, CE8-5.1b)", Joint Video Experts Team (JVET) of ITU-T SG 16 WP 3 and ISO/IEC JTC 1/SC 29/WG 11, Mar. 19-27, 2019, JVET-N0214.

M. Karczewicz et al., "CE8-related: Quantized residual BDPCM", Joint Video Experts Team (JVET) of ITU-T SG 16 WP 3 and ISO/IEC JTC 1/SC 29/WG 11, Mar. 19-27, 2019, JVET-N0413.

G. Clare et al., "CE8-related: BDPCM for chroma", Joint Video Experts Team (JVET) of ITU-T SG 16 WP 3 and ISO/IEC JTC 1/SC 29/WG 11, Jul. 3-12, 2019, JVET-O0166.

* cited by examiner

FIG. 6
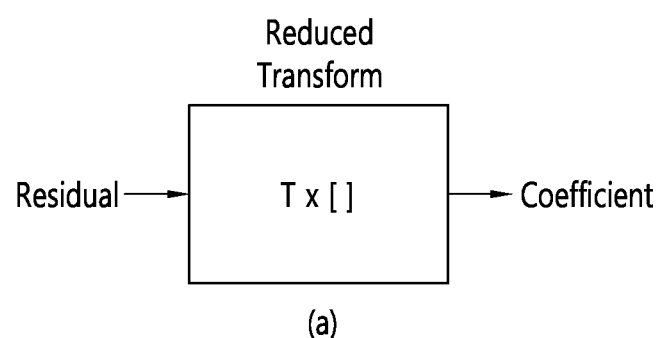
(a)
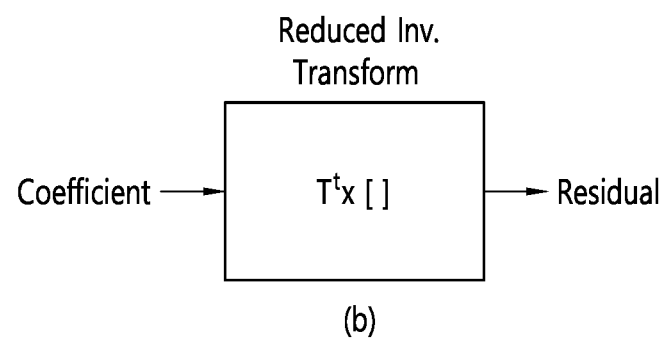
(b)

BDPCM-BASED IMAGE CODING METHOD AND DEVICE THEREFOR

This application is a Continuation of U.S. patent application Ser. No. 17/501,885, filed Oct. 14, 2021, which is a Continuation Application of International Application No. PCT/KR2020/005216, filed on Apr. 20, 2020, which claims the benefit of U.S. Provisional Application No. 62/836,656, filed on Apr. 20, 2019, the contents of which are all hereby incorporated by reference herein in their entirety.

TECHNICAL FIELD

The present disclosure relates generally to an image coding technology and, more particularly, to an image coding method based on a BDPCM (block differential pulse coded modulation) in an image coding system and an apparatus therefor.

RELATED ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present disclosure is to provide a method and an apparatus for increasing efficiency in transform index coding in image coding based on a BDPCM.

Another technical aspect of the present disclosure is to provide a method and an apparatus for increasing efficiency in transform skip flag coding in image coding based on a BDPCM Still another technical aspect of the present disclosure is to provide a method and an apparatus for performing BDPCM coding for each luma component or chroma component are provided.

According to an embodiment of the present disclosure, there is provided an image decoding method performed by a decoding apparatus. The method may include deriving quantized transform coefficients for a current block based on a BDPCM; deriving transform coefficients by performing a dequantization on the quantized transform coefficients; and deriving residual samples based on the transform coefficients; wherein when the BDPCM is applied to the current block, an inverse non-separable transform is not applied to the transform coefficients.

When the BDPCM is applied to the current block, the value of the transform index for the inverse non-separable transform that is applied to the current block is inferred to be 0.

When the BDPCM is applied to the current block, the value of a transform skip flag indicating whether a transform is skipped in the current block is inferred to be 0.

The BDPCM is individually applied to a luma block of the current block or a chroma block of the current block, wherein when the BDPCM is applied to the luma block, the transform index for the luma block is not received, and wherein when the BDPCM is applied to the chroma block, the transform index for the chroma block is not received.

When the width of the current block is less than or equal to a first threshold and the height of the current block is less than or equal to a second threshold, the BDPCM is applied to the current block.

Quantized transform coefficients are derived based on direction information on the direction in which the BDPCM is performed.

The image decoding method further comprises performing an intra prediction on the current block based on the direction in which the BDPCM is performed.

The direction information indicates a horizontal direction or a vertical direction According to another embodiment of the present disclosure, there is provided an image encoding method performed by an encoding apparatus. The method may include: deriving prediction samples for a current block based on a BDPCM; deriving residual samples for the current block based on the prediction samples; performing quantization on the residual samples; deriving quantized residual information based on the BDPCM; and encoding the quantized residual information and coding information for the current block; wherein when the BDPCM is applied to the current block, a non-separable transform is not applied to the current block.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

According to the present disclosure, it is possible to increase overall image/video compression efficiency.

According to the present disclosure, it is possible to increase overall image/video compression efficiency in transform index coding.

According to the present disclosure, it is possible to increase efficiency in transform index coding in image coding based on a BDPCM.

According to the present disclosure, it is possible to increase efficiency in transform skip flag coding in image coding based on a BDPCM.

According to the present disclosure, a method and an apparatus for performing BDPCM coding for each luma component or chroma component are provided.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

BRIEF DESCRIPTION OF THE DRAWINGS

FIG. 6 is a diagram illustrating an RST according to an embodiment of the present disclosure.

DESCRIPTION OF EXEMPLARY EMBODIMENTS

Figure 1:
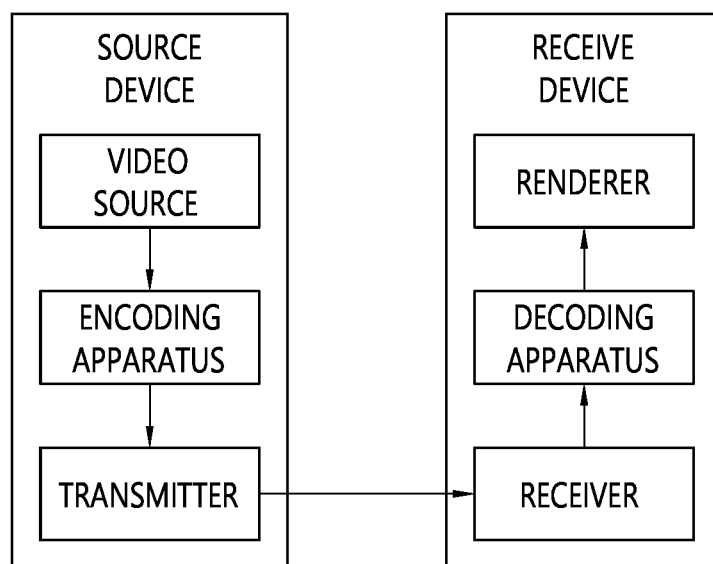
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
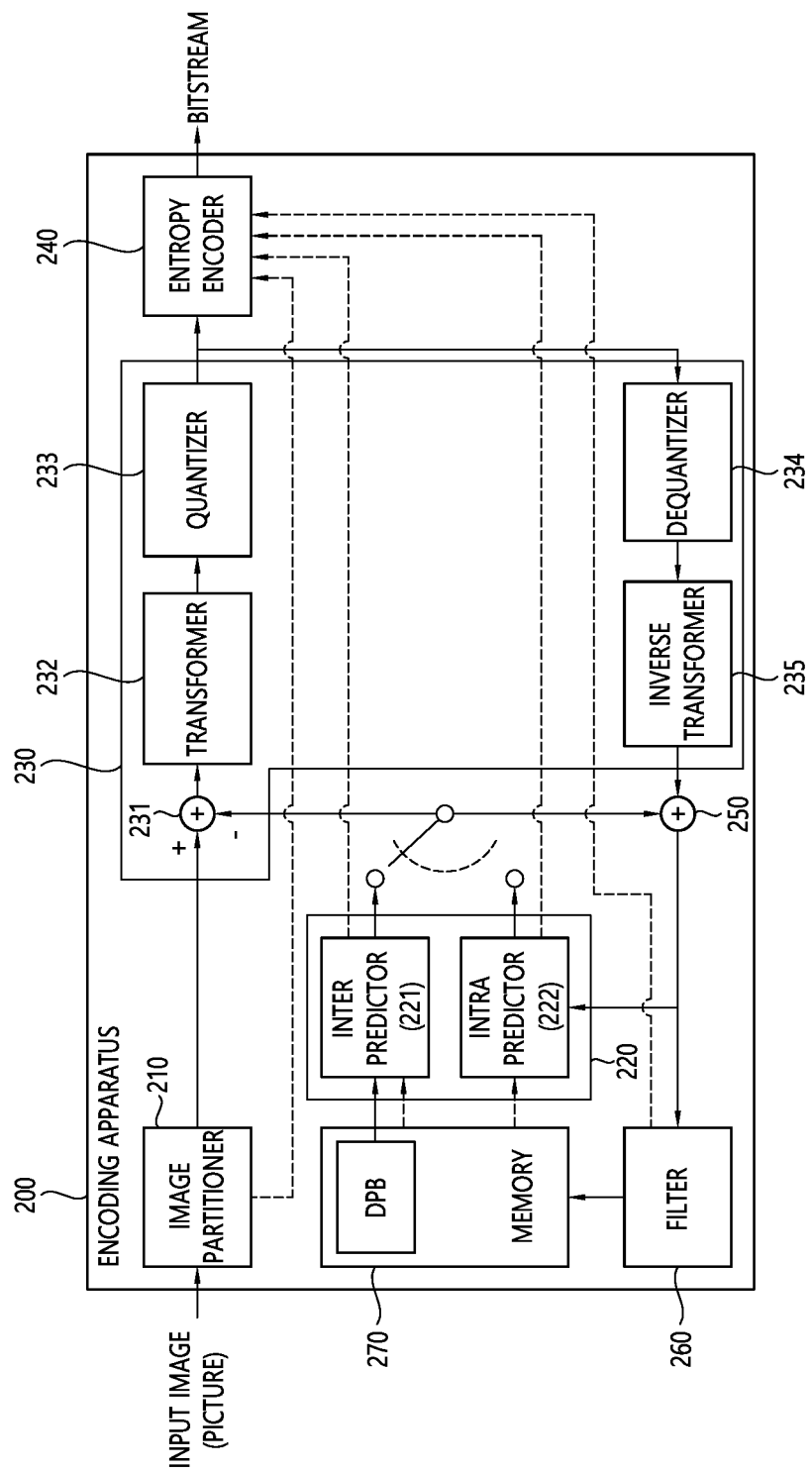
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the inter predictor 221 or the intra predictor 222 from an input image signal (original block, original sample array) to generate a residual signal (residual block, residual sample array), and the generated residual signal is transmitted to the transformer 232. In this case, as shown, a unit which subtracts the prediction signal (predicted block, prediction sample array) from the input image signal (original block, original sample array) in the encoder 200 may be called the subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loeve transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
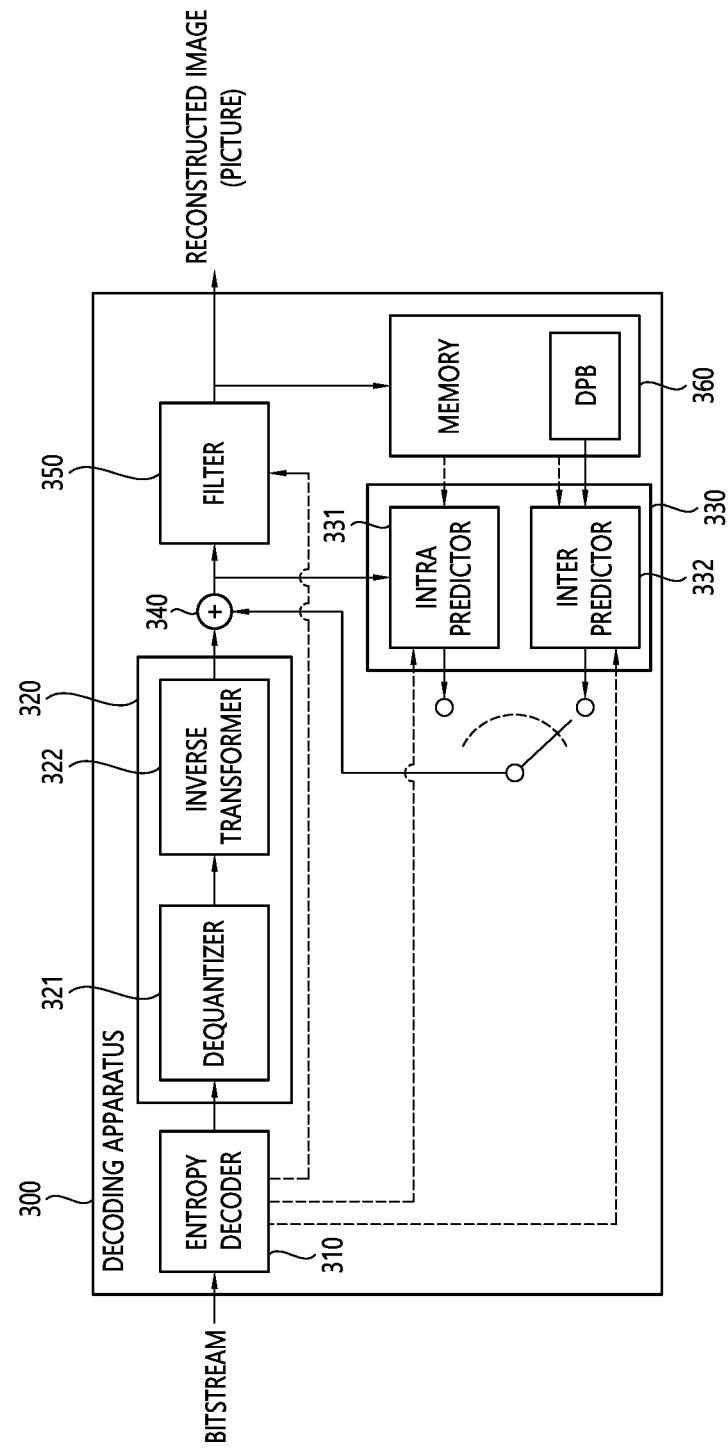
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the image decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The deqauntizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing image coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
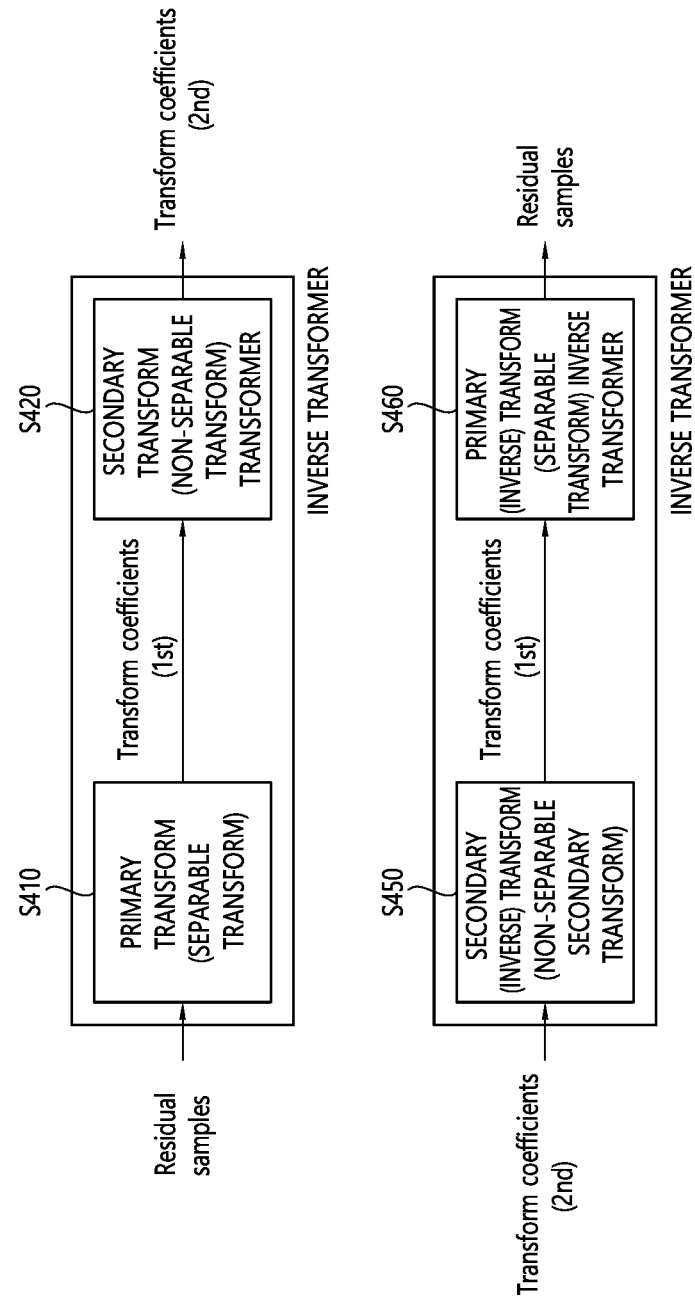
FIG. 4 schematically illustrates a multiple transform technique according to an embodiment of the present disclosure.

FIG. 4 schematically illustrates a multiple transform technique according to an embodiment of the present disclosure.

Referring to FIG. 4, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S410). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

In other words, when the conventional transform method is applied, transform coefficients might be generated by applying transform from a space domain to a frequency domain for a residual signal (or residual block) based on the DCT type 2. Unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be called a transform type, transform kernel or transform core. These DCT/DST transform types can be defined based on basis functions.

If the multiple core transform is performed, then a vertical transform kernel and a horizontal transform kernel for a target block may be selected from among the transform kernels, a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on a prediction mode and/or a transform index of a target block (CU or sub-block) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trTypeVer value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both both trTypeHor and trTypeVer values are 2.

In one example, transform kernel sets according to MTS index information are illustrated in the following table.

TABLE 1

| tu_mts_idx[x0][y0] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S420). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which the vertical and horizontal components of the (primary) transform coefficients are not separated, and for example, two-dimensional signals (transform coefficients) are re-arranged to a one-dimensional signal through a certain determined direction (e.g., row-first direction or column-first direction), and then modified transform coefficients (or secondary transform coefficients) are generated based on the non-separable transform matrix. For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8,W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 1]

If the X is represented in the form of a vector, the vector $\vec{X}$ may be represented as below.

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T$$ [Equation 2]

In Equation 2, the vector $\vec{X}$ is a one-dimensional vector obtained by rearranging the two-dimensional block X of Equation 1 according to the row-first order.

In this case, the secondary non-separable transform may be calculated as below.

$$\vec{F} = T \cdot \vec{X}$$ [Equation 3]

In this equation, $\vec{F}$ represents a transform coefficient vector, and T represents a 16×16 (non-separable) transform matrix.

Through foregoing Equation 3, a 16×1 transform coefficient vector $\vec{F}$ may be derived, and the $\vec{F}$ may be re-organized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that is applicable to an 8×8 region included in the transform coefficient block when both W and H are equal to or greater than 8, and the 8×8 region may be a top-left 8×8 region in the transform coefficient block. Similarly, the 4×4 transform refers to a transform that is applicable to a 4×4 region included in the transform coefficient block when both W and H are equal to or greater than 4, and the 4×4 region may be a top-left 4×4 region in the transform coefficient block. For example, an 8×8 transform kernel matrix may be a 64×64/16×64 matrix, and a 4×4 transform kernel matrix may be a 16×16/8×16 matrix.

Here, to select a mode-dependent transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

The sizes of the transforms, the numbers of sets, and the numbers of transform kernels in each set mentioned above are merely for illustration. Instead, a size other than 8×8 or 4×4 may be used, n sets may be configured, and k transform kernels may be included in each set.

The transform set may be called an NSST set, and the transform kernel in the NSST set may be called an NSST kernel. The selection of a specific set from among the transform sets may be performed, for example, based on the intra prediction mode of the target block (CU or sub-block).

For reference, as an example, the intra prediction mode may include two non-directional (or non-angular) intra prediction modes and 65 directional (or angular) intra prediction modes. The non-directional intra prediction modes may include a No. 0 planar intra prediction mode, and a No. 1 DC intra prediction mode, and the directional intra prediction modes may include 65 intra prediction modes between a No. 2 intra prediction mode and a No. 66 intra prediction mode. However, this is an example, and the present disclosure may be applied to a case where there are different number of intra prediction modes. Meanwhile, according to circumstances, a No. 67 intra prediction mode may be further used, and the No. 67 intra prediction mode may represent a linear model (LM) mode.

Figure 5:
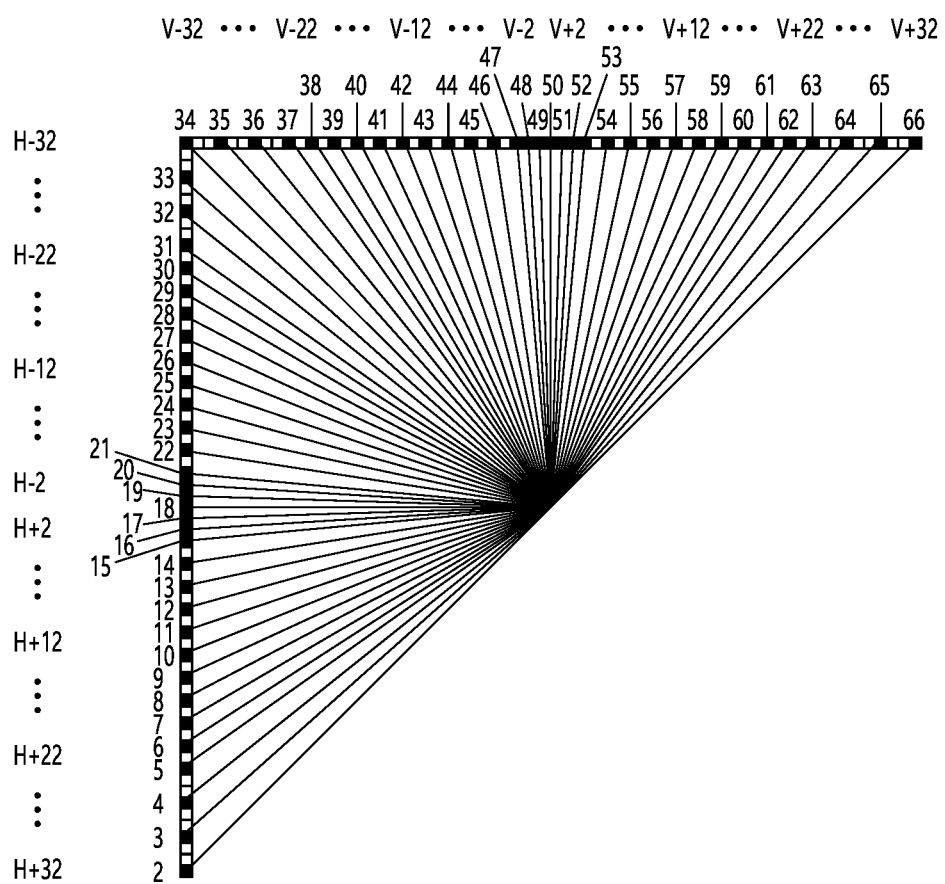
FIG. 5 illustrates directional intra modes of 65 prediction directions.

FIG. 5 illustrates directional intra modes of 65 prediction directions.

Referring to FIG. 5, on the basis of the No. 34 intra prediction mode having a left upward diagonal prediction direction, the intra prediction mode having a horizontal directionality and the intra prediction mode having vertical directionality may be classified. H and V of FIG. 5 mean horizontal directionality and vertical directionality, respectively, and numerals −32 to 32 indicate displacements in $\frac{1}{32}$ units on the sample grid position. This may represent an offset for the mode index value. The Nos. 2 to 33 intra prediction modes have the horizontal directionality, and the Nos. 34 to 66 intra prediction modes have the vertical directionality. Meanwhile, strictly speaking, the No. 34 intra prediction mode may be considered as being neither horizontal nor vertical, but it may be classified as belonging to the horizontal directionality in terms of determining the transform set of the secondary transform. This is because the input data is transposed to be used for the vertical direction mode symmetrical on the basis of the No. 34 intra prediction mode, and the input data alignment method for the horizontal mode is used for the No. 34 intra prediction mode. Transposing input data means that rows and columns of two-dimensional block data M×N are switched into N×M data. The No. 18 intra prediction mode and the No. 50 intra prediction mode may represent a horizontal intra prediction mode and a vertical intra prediction mode, respectively, and the No. 2 intra prediction mode may be called a right upward diagonal intra prediction mode because it has a left reference pixel and predicts in a right upward direction. In the same manner, the No. 34 intra prediction mode may be called a right downward diagonal intra prediction mode, and the No. 66 intra prediction mode may be called a left downward diagonal intra prediction mode.

In one example, four transform sets may be mapped according to an intra prediction mode as in the following table.

TABLE 2

| stPredModeIntra | stTrSetIdx |
|---|---|
| stPredModeIntra < 0 | 1 |
| 0 <= stPredModeIntra <= 1 | 0 |
| 2 <= stPredModeIntra <= 12 | 1 |

TABLE 2-continued

| stPredModeIntra | stTrSetIdx |
|---|---|
| 13 <= stPredModeIntra <= 23 | 2 |
| 24 <= stPredModeIntra <= 44 | 3 |
| 45 <= stPredModeIntra <= 55 | 2 |
| 56 <= stPredModeIntra | 1 |

As shown in Table 2, one of the four transform sets, that is, stTrSetIdx, may be mapped to one of four values, that is, 0 to 3, according to the intra prediction mode.

When a specific set is determined to be used for the non-separable transform, one of k transform kernels in the specific set may be selected through the non-separable secondary transform index. The encoding apparatus may derive a non-separable secondary transform index indicating a specific transform kernel based on the rate-distortion (RD) check, and may signal the non-separable secondary transform index to the decoding apparatus. The decoding apparatus may select one from among k transform kernels in the specific set based on the non-separable secondary transform index. For example, the NSST index value 0 may indicate a first non-separable secondary transform kernel, the NSST index value 1 may indicate a second non-separable secondary transform kernel, and the NSST index value 2 may indicate a third non-separable secondary transform kernel. Alternatively, the NSST index value 0 may indicate that the first non-separable secondary transform is not applied to a target block, and the NSST index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S450), and may obtain a residual block (residual samples) by performing a primary (inverse) transform on the (primary) transform coefficients (S460). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST or an RST, and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an NSST (or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, since the RST is mainly performed in a low frequency region including a non-zero coefficient in a transform block, it may be referred to as a Low-Frequency Non-Separable Transform (LFNST). The transform index may be referred to as an LFNST index.

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

FIG. 6 is a diagram illustrating an RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 4 below.

$$T_{R \times N} = \begin{bmatrix} t_{11} & t_{12} & t_{13} & & t_{1N} \\ t_{21} & t_{22} & t_{23} & \cdots & t_{2N} \\ \vdots & & \ddots & & \vdots \\ t_{R1} & t_{R2} & t_{R3} & \cdots & t_{RN} \end{bmatrix} \quad \text{[Equation 4]}$$

The matrix T in the Reduced Transform block shown in FIG. 6A may mean the matrix $T_{R \times N}$ of Equation 4. As shown in FIG. 6A, when the reduced transform matrix $T_{R \times N}$ is multiplied to residual samples for the target block, transform coefficients for the target block may be derived.

In an example, if the size of the block to which the transform is applied is 8×8 and R=16 (i.e., R/N=16/64=1/4), then the RST according to FIG. 6A may be expressed as a matrix operation as shown in Equation 5 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \ldots & t_{1,64} \\ t_{2,1} & t_{2,2} & t_{2,3} & & t_{2,64} \\ \vdots & & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix}$$ [Equation 5]

In Equation 5, r1 to r64 may represent residual samples for the target block and may be specifically transform coefficients generated by applying a primary transform. As a result of the calculation of Equation 5, transform coefficients ci for the target block may be derived, and a process of deriving ci may be as in Equation 6.

for i from to R:

$ci=0$ for j from 1 to N $ci+=ti,j*rj$ [Equation 6]

As a result of the calculation of Equation 6, transform coefficients c1 to cR for the target block may be derived. That is, when R=16, transform coefficients c1 to c16 for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix TN×R according to an example is N×R less than the size N×N of the regular inverse transform matrix, and is in a transpose relationship with the reduced transform matrix TR×N shown in Equation 4.

The matrix Tt in the Reduced Inv. Transform block shown in FIG. 6B may mean the inverse RST matrix TR×NT (the superscript T means transpose). When the inverse RST matrix TR×NT is multiplied to the transform coefficients for the target block as shown in FIG. 6B, the modified transform coefficients for the target block or the residual samples for the target block may be derived. The inverse RST matrix TR×NT may be expressed as (TR×NT)N×R.

More specifically, when the inverse RST is applied as the secondary inverse transform, the modified transform coefficients for the target block may be derived when the inverse RST matrix TR×NT is multiplied to the transform coefficients for the target block. Meanwhile, the inverse RST may be applied as the inverse primary transform, and in this case, the residual samples for the target block may be derived when the inverse RST matrix TR×NT is multiplied to the transform coefficients for the target block.

In an example, if the size of the block to which the inverse transform is applied is 8×8 and R=16 (i.e., R/N=16/64=1/4), then the RST according to FIG. 6B may be expressed as a matrix operation as shown in Equation 7 below.

$$\begin{bmatrix} t_{1,1} & t_{2,1} & & t_{16,1} \\ t_{1,2} & t_{2,2} & \ldots & t_{16,2} \\ t_{1,3} & t_{2,3} & & t_{16,3} \\ \vdots & \vdots & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix}$$ [Equation 7]

In Equation 7, c1 to c16 may represent the transform coefficients for the target block. As a result of the calculation of Equation 7, rj representing the modified transform coefficients for the target block or the residual samples for the target block may be derived, and the process of deriving rj may be as in Equation 8.

for i from to N:

$ri=0$ for j from 1 to R $ri+=tj,i*cj$ [Equation 8]

As a result of the calculation of Equation 8, r1 to rN representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

Meanwhile, a transform set configuration shown in Table 2 may also be applied to an 8×8 RST. That is, the 8×8 RST may be applied according to a transform set in Table 2. Since one transform set includes two or three transforms (kernels) according to an intra prediction mode, it may be configured to select one of up to four transforms including that in a case where no secondary transform is applied. In a transform where no secondary transform is applied, it may be considered to apply an identity matrix. Assuming that indexes 0, 1, 2, and 3 are respectively assigned to the four transforms (e.g., index 0 may be allocated to a case where an identity matrix is applied, that is, a case where no secondary transform is applied), an NSST index as a syntax element may be signaled for each transform coefficient block, thereby designating a transform to be applied. That is, through the NSST index, it is possible to designate an 8×8 NSST for a top-left 8×8 block and to designate an 8×8 RST in an RST configuration. The 8×8 NSST and the 8×8 RST refer to transforms applicable to an 8×8 region included in the transform coefficient block when both W and H of the target block to be transformed are equal to or greater than 8, and the 8×8 region may be a top-left 8×8 region in the transform coefficient block. Similarly, a 4×4 NSST and a 4×4 RST refer to transforms applicable to a 4×4 region included in the transform coefficient block when both W and H of the target block to are equal to or greater than 4, and the 4×4 region may be a top-left 4×4 region in the transform coefficient block.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients. That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. Here, the 48 pieces of data forming the 8×8 region may be properly arranged, thereby forming the 48×1 vector. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

For an inverse transform in a decoding process, the transposed matrix of the foregoing transform kernel matrix may be used. That is, when an inverse RST or LFNST is performed in an inverse transform process performed by the decoding apparatus, input coefficient data to which the inverse RST is applied is configured in a one-dimensional vector according to a predetermined arrangement order, and a modified coefficient vector obtained by multiplying the one-dimensional vector and a corresponding inverse RST matrix on the left of the one-dimensional vector may be arranged in a two-dimensional block according to a predetermined arrangement order.

In summary, in the transform process, when an RST or LFNST is applied to an 8×8 region, a matrix operation of 48 transform coefficients in top-left, top-right, and bottom-left regions of the 8×8 region excluding the bottom-right region among transform coefficients in the 8×8 region and a 16×48 transform kernel matrix. For the matrix operation, the 48 transform coefficients are input in a one-dimensional array. When the matrix operation is performed, 16 modified transform coefficients are derived, and the modified transform coefficients may be arranged in the top-left region of the 8×8 region.

On the contrary, in the inverse transform process, when an inverse RST or LFNST is applied to an 8×8 region, 16 transform coefficients corresponding to a top-left region of the 8×8 region among transform coefficients in the 8×8 region may be input in a one-dimensional array according to a scanning order and may be subjected to a matrix operation with a 48×16 transform kernel matrix. That is, the matrix operation may be expressed as (48×16 matrix)*(16×1 transform coefficient vector)=(48×1 modified transform coefficient vector). Here, an n×1 vector may be interpreted to have the same meaning as an n×1 matrix and may thus be expressed as an n×1 column vector. Further, * denotes matrix multiplication. When the matrix operation is performed, 48 modified transform coefficients may be derived, and the 48 modified transform coefficients may be arranged in top-left, top-right, and bottom-left regions of the 8×8 region excluding a bottom-right region.

When a secondary inverse transform is based on an RST, the inverse transformer 235 of the encoding apparatus 200 and the inverse transformer 322 of the decoding apparatus 300 may include an inverse reduced secondary transformer to derive modified transform coefficients based on an inverse RST on transform coefficients and an inverse primary transformer to derive residual samples for a target block based on an inverse primary transform on the modified transform coefficients. The inverse primary transform refers to the inverse transform of a primary transform applied to a residual. In the present disclosure, deriving a transform coefficient based on a transform may refer to deriving the transform coefficient by applying the transform.

Meanwhile, according to an embodiment, a block differential pulse coded modulation (BDPCM) technique may be used. BDPCM may also be called RDPCM (quantized residual block-based Delta Pulse Code Modulation).

When predicting a block by applying the BDPCM, reconstructed samples are used to predict a row or a column of the block line-by-line. In this case, the reference pixels used may be unfiltered samples. The BDPCM direction may indicate whether a vertical direction or a horizontal direction prediction is used. The prediction error is quantized in the spatial domain, and the pixel is reconstructed by adding the dequantized prediction error to the prediction samples. As an alternative to this BDPCM, a quantized residual domain BDPCM may be proposed, and the prediction direction or signaling may be the same as the BDPCM applied to the spatial domain. That is, the quantization coefficient itself can be accumulated like DPCM (Delta Pulse Code Modulation) through the quantized residual domain BDPCM, and then the residual can be reconstructed through dequantization. Therefore, the quantized residual domain BDPCM may be used in the sense of applying DPCM in the residual coding. A quantized residual domain used below is quantized residuals without transformation in which residuals derived based on prediction is quantized, and refers to a domain for a quantized residual samples.

For a block of size M(row)×N(column), let's assume that prediction residuals obtained by performing intra prediction in the horizontal direction (copying the left neighboring pixel line to the prediction block line by line) or the intra prediction in the vertical direction (copying the upper neighboring line to the prediction block line-by-line) using unfiltered samples among the left or upper boundary samples are $r_{(i,j)}$ (0≤i≤M−1, 0≤j≤N−1). And, suppose that the quantized version of the residual $r_{(i,j)}$ is $Q(r_{(i,j)})$ (0≤i≤M−1, 0≤j≤N−1). Here, the residual means a difference value between the value of the original block and the value of the prediction block.

Then, when the BDPCM is applied to the quantized residual samples, a modified array $\tilde{R}$ of M×N configured with $\tilde{r}_{i,j}$ is derived.

When vertical BDPCM is signaled, $\tilde{r}_{i,j}$ is as follows.

$$\tilde{r}_{i,j} = \begin{cases} Q(r_{i,j}), & i=0, 0 \le j \le (N-1) \\ Q(r_{i,j})-Q(r_{(i-1),j}), & 1 \le i \le (M-1), 0 \le j \le (N-1) \end{cases} \quad \text{[Equation 9]}$$

Similarly applied to horizontal prediction, the residual quantized samples are as follows.

$$\tilde{r}_{i,j} = \begin{cases} Q(r_{i,j}), & 0 \le i \le (M-1), j=0 \\ Q(r_{i,j})-Q(r_{i,(j-1)}), & 0 \le i \le (M-1), 1 \le j \le (N-1) \end{cases} \quad \text{[Equation 10]}$$

The quantized residual sample ($\tilde{r}_{i,j}$) is transmitted to the decoding device.

In the decoding apparatus, in order to derive $Q(r_{(i,j)})$ ($0 \le i \le M-1$, $0 \le j \le N-1$.), the above operation is performed inversely.

For vertical prediction, the following equation can be applied.

$$Q(r_{i,j}) = \Sigma_{k=0}^{i} \tilde{r}_{k,j}, 0 \le i \le (M-1), 0 \le j \le (N-1). \quad \text{[Equation 11]}$$

In addition, the following equation may be applied to horizontal prediction.

$$Q(r_{i,j}) = \sum_{k=0}^{j} \tilde{r}_{i,k}, 0 \le i \le (M-1), 0 \le j \le (N-1) \quad \text{[Equation 12]}$$

The dequantized quantized residual $Q-1(Q(r_{(i,j)}))$ is summed with the intra block prediction value to derive a reconstructed sample value.

The main advantage of this technique is that the inverse BDPCM can be immediately performed by simply adding predictors at the time of parsing the coefficients or after parsing during the parsing of the coefficients.

As described above, the BDPCM may be applied to a quantized residual domain, and the quantized residual domain may include quantized residuals (or quantized residual coefficients), at this time transform skip may be applied to the residuals. That is, for the residual sample, the transform is skipped and quantization can be applied. Alternatively, the quantized residual domain may include quantized transform coefficients. A flag for whether the BDPCM is applicable may be signaled at the sequence level (SPS), and this flag may be signaled only when it is signaled that the transform skip mode is enabled in the SPS.

When the BDPCM is applied, intra prediction for the quantized residual domain is performed on the entire block by sample copy according to a prediction direction similar to the intra prediction direction (eg, vertical prediction or horizontal prediction). The residuals are quantized, and the delta values, i.e., the difference values ($\tilde{r}_{i,j}$) are coded between the quantized residuals and the predictors in the horizontal or vertical direction (ie, the quantized residual in the horizontal or vertical direction).

If the BDPCM is applicable, when the CU size is less than or equal to MaxTsSize (maximum transform skip size) for luma samples, and the CU is coded with intra prediction, flag information may be transmitted at the CU level. Here, MaxTsSize means the maximum block size for allowing the transform skip mode. This flag information indicates whether a conventional intra coding or the BDPCM is applied. When the BDPCM is applied, a BDPCM prediction direction flag indicating whether the prediction direction is a horizontal direction or a vertical direction may be transmitted. Then, the block is predicted through a conventional horizontal or vertical intra prediction process using unfiltered reference samples. The residuals are quantized, and the difference value between each quantized residual and its predictor, for example, the already quantized residual of the neighboring position in the horizontal or vertical direction according to the BDPCM prediction direction, is coded.

The syntax elements for the above-described contents and semantics thereof are shown in a table as follows.

TABLE 3

| 7.3.2.3 Sequence parameter set RBSP syntax | |
|---|---|
| sps_sao_enabled_flag | u(1) |
| sps_alf_enabled_flag | u(1) |
| if( sps_alf_enabled_flag && chromaArrayType != 0 ) | |
|   sps_ccalf_enabled_flag | u(1) |
| sps_transform_skip_enabled_flag | u(1) |
| if( sps_tranform_skip_enables_flag ) { | |
|   log2_tranform_skip_max_size_minus2 | ue(v) |
|   sps_bdpcm_enabled_flag | u(1) |

| 7.4.3.3 Sequence parameter set RBSP semantics |
|---|
| sps_bdpcm_enabled_flag equal to 1 specifies that intra_bdpcm_luma_flag and intra_bdpcm_chroma_flag may be present in the coding unit syntax for intra coding units. sps_bdpcm_enabled_flag equal to 0 specifies that intra_bdpcm_luma_flag and intra_bdpcm_chroma_flag are not present in the coding unit syntax for intra coding units. When not present, the value of sps_bdpcm_enabled_flag is inferred to be equal to 0. |

Table 3 shows "sps_bdpcm_enabled_flag" signaled in a sequence parameter set (SPS), and when the syntax element "sps_bdpcm_enabled_flag" is 1, flag information indicating whether BDPCM is applied to a coding unit in which intra prediction is performed, that is, "intra_bdpcm_luma_flag" and "intra_bdpcm_chroma_flag" Indicates are present in the coding unit.

If the syntax element "sps_bdpcm_enabled_flag" does not exist, its value is inferred to be 0.

TABLE 4

| 7.3.10.5Coding unit syntax | |
|---|---|
| if sps_bdpcm_enabled_flag && | |
|   cbWidth <= MaxTsSize && cbHeight <= MaxTsSize ) | |
|     intra_bdpcm_luma_flag | ae(v) |
|   if(intra_bdpcm_luma_flag ) | |
|     intra_bdpcm_luma_dir_flag | ae(v) |
| if ( treeType == SINGLE_TREE \| \| treeType == DUAL_TREE_CHROMA ) && | |
|   ChromaArrayType != 0 ) { | |
|   if( pred_mode_plt_flag && treeType == DUAL_TREE_CHROMA ) | |
|     palette_coding( x0, y0, cbWidth/SubWidthC, cbHeight/SubHeightC, treeType ) | |
|   else if( !pred_mode_plt_flag ) { | |

TABLE 4-continued

```
if ( leu_act_enabled_flag ) {
  if( cbWidth/SubWidthC <= MaxTsSize && cbHeight/SubHeightC <= MaxTsSize
      && sps_bdpcm_enabled_flag )
    intra_bdpcm_chroma_flag                                              ae(v)
  if( intra_bdpcm_chroma_flag )
    intra_bdpcm_chroma_dir_flag                                          ae(v)
```

7.4.11.5 Coding unit semantics intra_bdpcm_luma_flag equal to 1 specifies that BDPCM is applied to the current luma coding block at the location (x0, y0 ), i.e. the transform is skipped, the intra luma prediction mode is specified by intra_bdpcm_luma_dir_flag. intra_bdpcm_luma_flag equal to 0 specifies that BDPCM is not applied to the current luma coding block at the location { x0, y0 }.
When intra_bdpcm_luma_flag is not present it is inferred to be equal to 0.
The variable BdpcmFlag[ x ][ y ][ cIdx ] is set equal to intra_bdpcm_luma_flag for
x = x0..x0 + cbWidth − 1, y = y0..y0 + cbHeight − 1 and cIdx = 0.
intra_bdpcm_luma_dir_flag equal to 0 specifies that the BDPCM prediction direction is horizontal.
intra_bdpcm_luma_dir_flag equal to 1 specifies that the BDPCM prediction direction is vertical.
The variable BdpcmDir[ x ][ y ][ cIdx ] is set equal to intra_bdpcm_luma_dir_flag for
x = x0..x0 + cbWidth − 1, y = y0..y0 + cbHeight − 1 and cIdx = 0.
intra_bdpcm_chroma_flag equal to 1 specifies that BDPCM is applied to the current chroma coding blocks at the location { x0, 0 } i.e. the transform is skipped, the intra chroma prediction mode is specified by intra_bdpcm_chroma_dir_flag. intra_bdpcm_chroma_flag equal to 0 specifies that BDPCM is not applied to the current chroma coding blocks at the location { x0, y0 }.
When intra_bdpcm_chroma_flag is not present it is inferred to be equal to 0.
The variable BdpcmFlag[ x ][ y ][ cIdx ] is set equal to intra_bdpcm_chroma_flag for
x = x0..x0 + cbWidth − 1, y = y0..y0 + cbHeight − 1 and cIdx = 1..2.
intra_bdpcm_chroma_dir_flag equal to 0 specifies that the BDPCM prediction direction is horizontal
intra_bdpcm_chroma_dir_flag equal to 1 specifies that the BDPCM prediction direction is vertical.
The variable BdpcmDir[ x ][ y ][ cIdx ] is set equal to intra_bdpcm_chroma_dir_flag for
x = x0..x0 + cbWidth − 1, y = y0..y0 + cbHeight − 1 and cIdx = 1.2.

As described in Table 3, the syntax elements "intra_bdpcm_luma_flag" and "intra_bdpcm_chroma_flag" of Table 4 indicate whether BDPCM is applied to the current luma coding block or the current chroma coding block. If the value of "intra_bdpcm_luma_flag" or "intra_bdpcm_chroma_flag" is 1, the transformation for the corresponding coding block is skipped, and the prediction mode for the coding block mat be set to the horizontal or vertical direction according to "intra_bdpcm_luma_dir_flag" or "intra_bdpcm_chroma_dir_flag" indicating the prediction direction. If "intra_bdpcm_luma_flag" or "intra_bdpcm_chroma_flag" is not present, this value is inferred as 0.

If intra_bdpcm_luma_dir_flag" or "intra_bdpcm_chroma_dir_flag" indicating the prediction direction is 0, it indicates that the BDPCM prediction direction is a horizontal direction, and if the value is 1, it indicates that the BDPCM prediction direction is a vertical direction.

An intra prediction process based on the flag information is shown in a table as follows.

TABLE 5

8.4.3 Derivation process for luma intra prediction mode
Input to this process are:
- a luma location ( xCb, yCb ) specifying the top-left sample of the current luma coding block
  relative to the top-left luma sample of the current picture.
- a variable cbWidth specifying the width of the current coding block in luma samples
- a variable cbHeight specifying the height of the current coding block in luma samples.
In this process, the luma intra prediction mode IntraPredModeY[ xCb ][ yCb ] is derived
Table 19 specifies the value for the intra prediction mode IntraPredModeY[ xCb ][ yCb ] and the
  associated names TABLE 19
Specification of intra prediction mode and associated names

| Intra prediction mode | Associated name |
| --- | --- |
| 0 | INTRA_PLANAR |
| 1 | INTRA_DC |
| 2 ... 66 | INTRA_ANGULAR2 ... INTRA_ANGULAR66 |
| 81 ... 83 | INTRA_LT_CCLM_INTRA_L_CCLM, INTRA_T_CCLM |

NOTE-: The intra prediction moes INTRA_LT_CCLM, INTRA_L_CCLM and INTRA_T_CCLM
  are only applicable to chroma components.
IntraPredModeY[ xCb ][ yCb ] is derived as follows:
- if intra_luma_not_planar_flag[ xCb ][ yCb ] is equal to 0, IntraPredModeY[ xCb ][ yCb ] is set equal
  to INTRA_PLANAR.
- Otherwise, if BdpcmFlag[ xCb ][ yCb ][ 0 ] is equal to 1, IntraPredModeY[ xCb ][ yCb ] is set equal
  to BdpcmDir [ xCb ][ yCb ][ 0 ] ? INTRA_ANGULAR50 : INTRA_ANGULAR18.

Table 5 shows the process of deriving the intra prediction mode, and the intra prediction mode (IntraPredModeY[xCb][yCb]) is set to INTRA_PLANAR according to "Table 19" when intra_luma_not_planar_flag[xCb][yCb] is 0, and when intra_luma_not_planar_flag If xCb][yCb] is 1, it may be set to a vertical mode (INTRA_ANGULAR50) or a horizontal mode (INTRA_ANGULAR18) according to the variable BdpcmDir[xCb][yCb][0].

The variable BdpcmDir[xCb][yCb][0] is set equal to the value of intra_bdpcm_luma_dir_flag or intra_bdpcm_chroma_dir_flag, as shown in Table 4. Accordingly, the intra prediction mode may be set to a horizontal mode if the variable BdpcmDir[xCb][yCb][0] is 0, and to a vertical mode if it is 1.

In addition, when the BDPCM is applied, a dequantization process can be represented as shown in Table 6.

TABLE 6

| 8.4.3 Scaling process for transform coefficients |
| --- |
| Inputs to this process are:<br>  a luma location { xTby, yTby } specifying the top-left sample of the current luma transform block<br>  relative to the top-left luma sample of the current picture<br>  a variable nTbw specifying the transform block width.<br>  a variable nTbH specifying the transform block height.<br>  a variable predMode specifying the prediction mode of the coding unit<br>  a variable cIdx specifying the colour component of the current block.<br>Output of this process is the (nTbW)x(nTbH) array d of scaled transform coefficients with elements d[ x ][ y ].<br>For the derivation of the scaled transform coefficients d[ x ][ y ] with x = 0..nTbW − 1, y = 0..nTbH − 1, the following applies<br>...<br>  When BdpcmFlag[ xTbY ][ yYbY ][ cIdx ] is equal to 1, dz[ x ][ y ] is modified as follows:<br>    If BdpcmDir[ xTbY ][ yYbY ][ cIdx ] is equal to 0 and x is greater than 0, the following applies:<br>      dz[ x ][ y ] = Clip3( CoeffMin, CoeffMax, dz[ x − 1 ][ y ] + dz[ x ][ y ])<br>    Otherwise, if BdpcmDir[ xTbY ][ yYbY ][ cIdx ] is equal to 1 and y is greater than 0, the following applies:<br>      dz[ x ][ y ] = Clip3( CoeffMin, CoeffMax, dz[ x ][ y − 1 ] + dz[ x ][ y ])<br>  The value dnc[ x ][ y ] is derived as follows:<br>    dnc[ x ][ y ] = ( dz[ x ][ y ] * ls[ x ][ y ] +bdOffset) >> bdshift<br>  The scaled transform coefficient d[ x ][ y ] is derived as follows:<br>    d[ x ][ y ] = Clip3( CoeffMin, CoeffMax, dnc[ x ][ y ] ) |

Table 6 shows the dequantization process for transform coefficients (8.4.3 Scaling process for transform coefficients). If the BdpcmFlag[xTbY][yYbY][cIdx] value is 1, the dequantized residual value (d[x y]) can be derived based on the intermediate variable dz[x][y]. If BdpcmDir[xTbY][yYbY][cIdx] is 0, that is, when intra prediction is performed by horizontal mode, the variable dz[x][y] is "dz[x−1][y]+dz[x][y]". Also, if BdpcmDir[xTbY][yYbY][cIdx] is 1, that is, when intra prediction is performed by the vertical mode, the variable dz[x][y] is "dz[x][y−1]+dz[x][y]". That is, the residual at the specific location may be derived based on the sum of the residual at the previous location in the horizontal or vertical direction and a value received as residual information at the specific location. This is because when BDPCM is applied, the difference between the residual sample value at a specific position (x, y) (x increases from left to right as a horizontal coordinate, y increases from top to bottom as a vertical coordinate, and the position in the 2D block is expressed as (x, y). Also, the specific position represents the (x, y) position when the top-left position of the corresponding transformation block is set (0, 0)) and the residual sample value at the previous position ((x−1, y) or (x, y−1)) in the horizontal or vertical direction is signaled as residual information.

Meanwhile, according to an example, when the BDPCM is applied, an inverse secondary transform that is a non-separable transform, for example, the LFNST may not be applied. Therefore, when the BDPCM is applied, an LFNST index (a transform index) signaling may be omitted. As described above, it is possible to indicate whether or not to apply the LFNST and which transform kernel matrix for the LFNST to be applied through the LFNST index. For example, if the LFNST index value is 0, it indicates that LFNST is not applied, and if the LFNST index value is 1 or 2, one of two transform kernel matrices constituting the LFNST transform set selected based on the intra prediction mode may be specified. More specific embodiments related to the BDPCM and the LFNST may be applied as follows.

First Embodiment

The BDPCM can be applied only to either the luma component or the chroma component. In the case of separately coding the CTU split tree for the luma component and the CTU split tree for the chroma component (eg, a dual tree structure in the VVC standard), assuming that BDPCM is applied only to the luma component, the LFNST index may be transmitted only when the BDPCM is not applied to the luma component, and the LFNST index may be transmitted to all blocks to which the LFNST can be applied to the chroma component. Conversely, in the dual tree structure, assuming that BDPCM is applied only to the chroma component, the LFNST index can be transmitted only when BDPCM is not applied to the chroma component, and the LFNST indexes may be transmitted for all blocks to which LFNST can be applied for the luma component.

Second Embodiment

When the luma component and the chroma component are coded with the same CTU split tree, that is, when they share a split type (eg, a single tree structure in the VVC standard), in a block to which the BDPCM is applied, the LFNST may not be applied to both the luma component and the chroma component. Alternatively, it may be configured to apply the LFNST to only one component (eg, luma component or chroma component) for a block to which the BDPCM is applied. In this case, only the LFNST index for the corresponding component may be coded and signaled.

Third Embodiment

When the BDPCM is applied only to a specific type of image or partial image (eg, intra prediction image, intra slice, etc.), it may be configured to apply the BDPCM only to the image or partial image of the corresponding type. For an image or partial image to which the BDPCM is applied, the LFNST index may be transmitted for each block to which the BDPCM is not applied, and for a type or partial image to which the BDPCM is not applied, the LFNST index for all blocks to which the LFNST may be applied can be transmitted. Here, the block may be a coding block or a transform block.

Fourth Embodiment

The BDPCM can be applied only to blocks of a specific size or less. For example, it can be configured to apply the BDPCM only when a block has a width of W or less and a height of H or less. Here, W and H may be set to 32, respectively. If the width of a block is W or less and the height is H or less, so that the BDPCM can be applied, the LFNST index may be transmitted only when a flag indicating whether the BDPCM is applied is coded as 0 (when BDPCM is not applied).

On the other hand, when the width of a block is greater than W or the height is greater than H, since the BDPCM is not applied, signaling of a flag indicating whether or not the BDPCM is applied is unnecessary, and the LFNST index may be transmitted for all blocks to which the LFNST can be applied.

Fifth Embodiment

Combinations of the above first to fourth embodiments may be applied. For example, 1) the BDPCM is applied only to the luma component, 2) the BDPCM is applied only to intra slices, 3) the BDPCM is configured to be applied only when both width and height are 32 or less, and the LFNST index may be coded and signaled for blocks to which the BDPCM is applied.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 7:
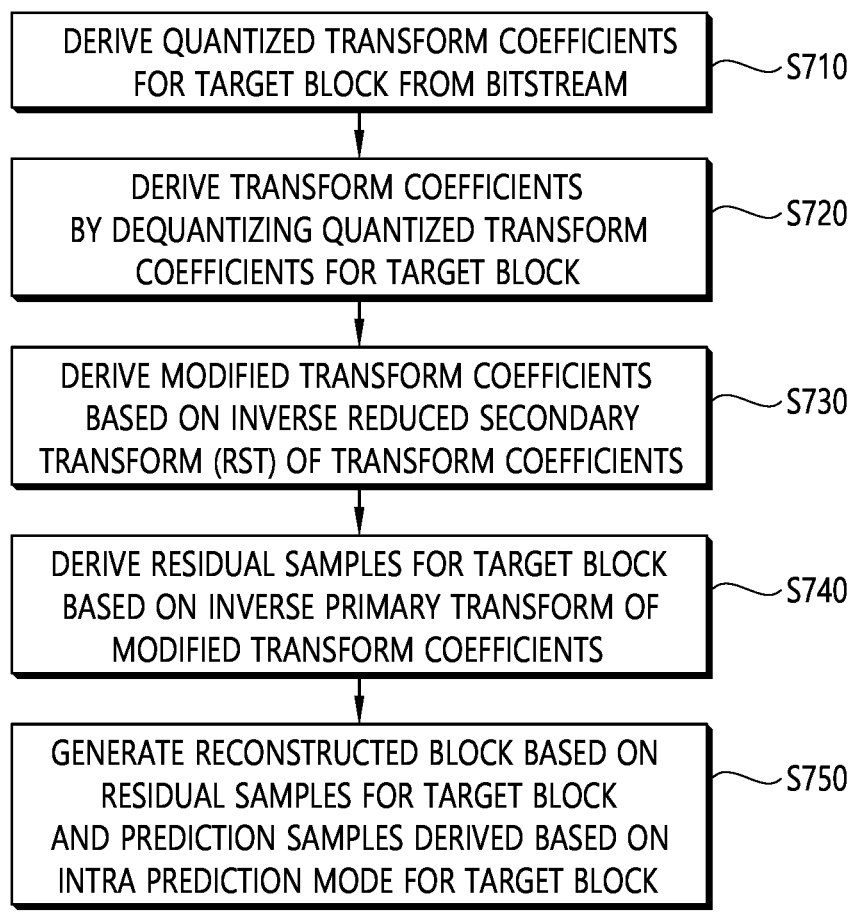
FIG. 7 is a flowchart illustrating an operation of an image decoding apparatus according to an embodiment of the present disclosure.

FIG. 7 is a flowchart illustrating an operation of an image decoding apparatus according to an embodiment of the present disclosure.

Each operation illustrated in FIG. 7 may be performed by the decoding apparatus 300 illustrated in FIG. 3. Specifically, S710 may be performed by the entropy decoder 310 illustrated in FIG. 3, S720 may be performed by the dequantizer 321 illustrated in FIGS. 3, S730 and S740 may be performed by the inverse transformer 322 illustrated in FIG. 3, and S750 may be performed by the adder 340 illustrated in FIG. 3. Operations according to S710 to S750 are based on some of the foregoing details explained with reference to FIG. 4 to FIG. 6. Therefore, a description of specific details overlapping with those explained above with reference to FIG. 4 to FIG. 6 will be omitted or will be made briefly.

The decoding apparatus 300 according to an embodiment may derive quantized transform coefficients for a target block from a bitstream (S710). Specifically, the decoding apparatus 300 may decode information on the quantized transform coefficients for the target block from the bitstream and may derive the quantized transform coefficients for the target block based on the information on the quantized transform coefficients for the target block. The information on the quantized transform coefficients for the target block may be included in a sequence parameter set (SPS) or a slice header and may include at least one of information on whether a reduced transform (RST) is applied, information on a reduced factor, information on a minimum transform size to which the RST is applied, information on a maximum transform size to which the RST is applied, information on a reduced inverse transform size, and information on a transform index indicating any one of transform kernel matrices included in a transform set.

The decoding apparatus 300 according to an embodiment may derive transform coefficients by dequantizing the quantized transform coefficients for the target block (S720).

The decoding apparatus 300 according to an embodiment may derive modified transform coefficients based on an inverse non-separable transform or an inverse reduced secondary transform (RST) of the transform coefficients (S730).

In an example, the inverse non-separable transform or the inverse RST may be performed based on an inverse RST transform matrix, and the inverse RST transform matrix may be a nonsquare matrix in which the number of columns is less than the number of rows.

In an embodiment, S730 may include decoding a transform index, determining whether a condition for applying an inverse RST is satisfied based on the transform index, selecting a transform kernel matrix, and applying the inverse RST to the transform coefficients based on the selected transform kernel matrix and/or the reduced factor when the condition for applying the inverse RST is satisfied. In this case, the size of an inverse RST matrix may be determined based on the reduced factor.

The decoding apparatus 300 according to an embodiment may derive residual samples for the target block based on an inverse transform of the modified transform coefficients (S740).

The decoding apparatus 300 may perform an inverse primary transform on the modified transform coefficients for the target block, in which case a reduced inverse transform may be applied or a conventional separable transform may be used as the inverse primary transform.

The decoding apparatus 300 according to an embodiment may generate reconstructed samples based on the residual samples for the target block and prediction samples for the target block (S750).

Referring to S730, it may be identified that the residual samples for the target block are derived based on the inverse RST of the transform coefficients for the target block. From the perspective of the size of the inverse transform matrix, since the size of a regular inverse transform matrix is N×N but the size of the inverse RST matrix is reduced to N×R, it is possible to reduce memory usage in a case of performing the inverse RST by an R/N ratio compared to that in a case of performing a regular transform. Further, using the inverse RST matrix can reduce the number of multiplications (N×R) by the R/N ratio, compared to the number of multiplications N×N in a case of using the regular inverse transform matrix. In addition, since only R transform coefficients need to be decoded when the inverse RST is applied, the total number of transform coefficients for the target block may be reduced from N to R, compared to that in a case where N transform coefficients needs to be decoded when a regular inverse transform is applied, thus increasing decoding efficiency.

That is, according to S730, the (inverse) transform efficiency and decoding efficiency of the decoding apparatus 300 may be increased through the inverse RST.

Figure 8:
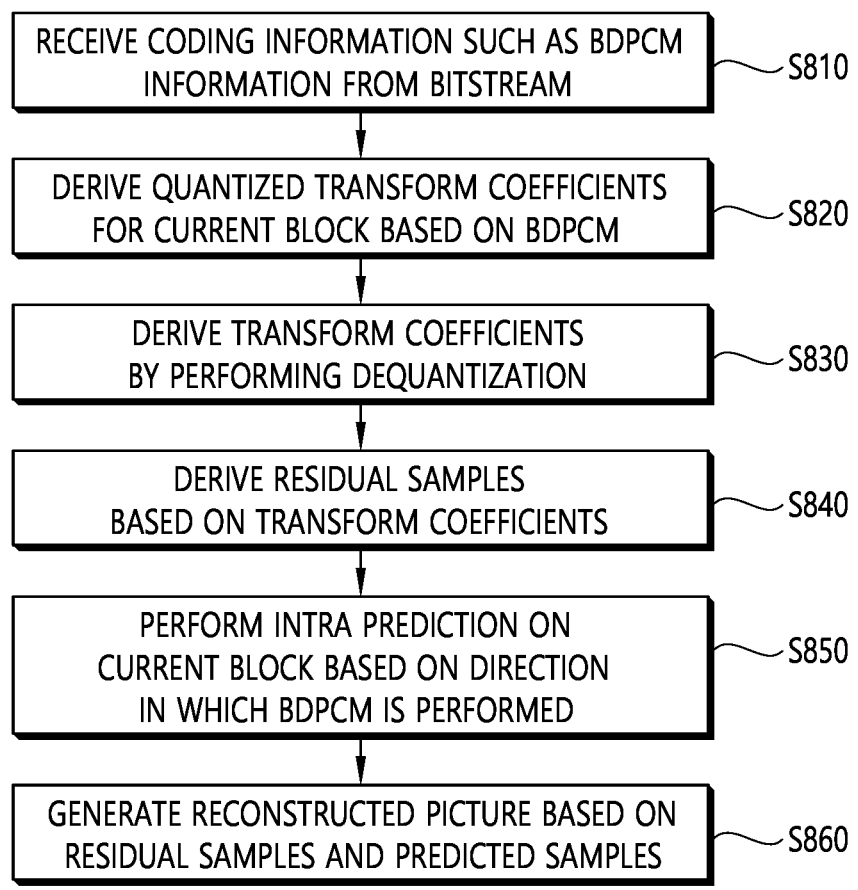
FIG. 8 is a control flowchart illustrating an image decoding method according to an embodiment of the present disclosure.

FIG. 8 is a control flowchart illustrating an image decoding method according to an embodiment of the present document.

The decoding device 300 receives coding information such as BDPCM information from the bitstream (S810). In addition, the decoding apparatus 300 may be further received transform skip flag information indicating whether transform skip is applied to the current block, transform index information for inverse secondary transform, that is, inverse non-separable transform, ie, the LFNST index or MTS index information indicating a transform kernel of the inverse primary transform.

The BDPCM information may include BDPCM flag information indicating whether the BDPCM is applied to the current block and direction information on a direction in which the BDPCM is performed.

If the BDPCM is applied to the current block, the BDPCM flag value may be 1, and if the BDPCM is not applied to the current block, the BDPCM flag value may be 0.

When the BDPCM is applied to the current block, the transform skip flag value may be inferred as 1, and when the transform skip flag value is 1, the LFNST index value may be inferred as 0 or not received. That is, when the BDPCM is applied to the current block, the transform may not be applied to the current block.

Meanwhile, the tree type of the current block may be divided into a single tree (SINGLE_TREE) or a dual tree (DUAL_TREE) depending on whether the luma block and the corresponding chroma block have an individual partition structure. When the chroma block has the same partition structure as the luma block, it may be represented as a single tree, and when the chroma component block has a partition structure different from that of the luma block, it may be represented as a dual tree. According to an example, the BDPCM may be individually applied to a luma block or a chroma block of the current block. If the BDPCM is applied to the luma block, the transform index for the luma block may not be received, and if the BDPCM is applied to the chroma block, the transform index for the chroma block may not be received.

When the tree structure of the current block is the dual tree, the BDPCM can be applied to only one component block, and even when the current block has the single tree structure, the BDPCM can be applied to only one component block. In this case, the LFNST index may be received only for component blocks to which the BDPCM is not applied.

Alternatively, according to an example, the BDPCM may be applied only when the width of the current block is less than or equal to the first threshold and the height of the current block is less than or equal to the second threshold. The first threshold value and the second threshold value may be 32, and may be set to a maximum height or a maximum width of a transformation block in which transformation is performed.

Meanwhile, the direction information for the BDPCM may indicate a horizontal direction or a vertical direction, and quantization information may be derived according to the direction information and a prediction sample may be derived according to the direction information.

The decoding apparatus 300 may derive quantized transform coefficients for the current block based on the BDPCM (S820). Here, the transform coefficients may be an untransformed residual sample values.

When the BDPCM is applied to the current block, residual information received by the decoding apparatus 300 may be a difference value of a quantized residual. Depending on the BDPCM direction, a difference value between a quantized residual in a previous vertical line or a previous horizontal direction line and a quantized residual of a specific line may be received, and the decoding apparatus 300 may derive the quantized residual of the specific line by adding the quantized residual value of the previous vertical or horizontal line to the difference value of the received quantized residual. The quantized residual may be derived based on Equation 11 or Equation 12.

The decoding apparatus 300 may derive transform coefficients by performing the dequantization on the quantized transform coefficients (S830), and may derive residual samples based on the transform coefficients (S840).

As described above, when the BDPCM is applied to the current block, the dequantized transform coefficient may be derived as a residual sample without the transform process.

The intra prediction unit 331 may perform intra prediction on the current block based on the direction in which the BDPCM is performed (S850).

If the BDPCM is applied to the current block, intra prediction using the same may be performed, which may mean that the BDPCM may be applied only to an intra slice or an intra coding block predicted in the intra mode.

The intra prediction is performed based on the direction information for the BDPCM, and the intra prediction mode of the current block may be either a horizontal direction mode or a vertical direction mode.

The decoding apparatus 300 may generate a reconstructed picture based on the derived residual samples and the predicted samples as in S750 of FIG. 7 (S860).

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 9:
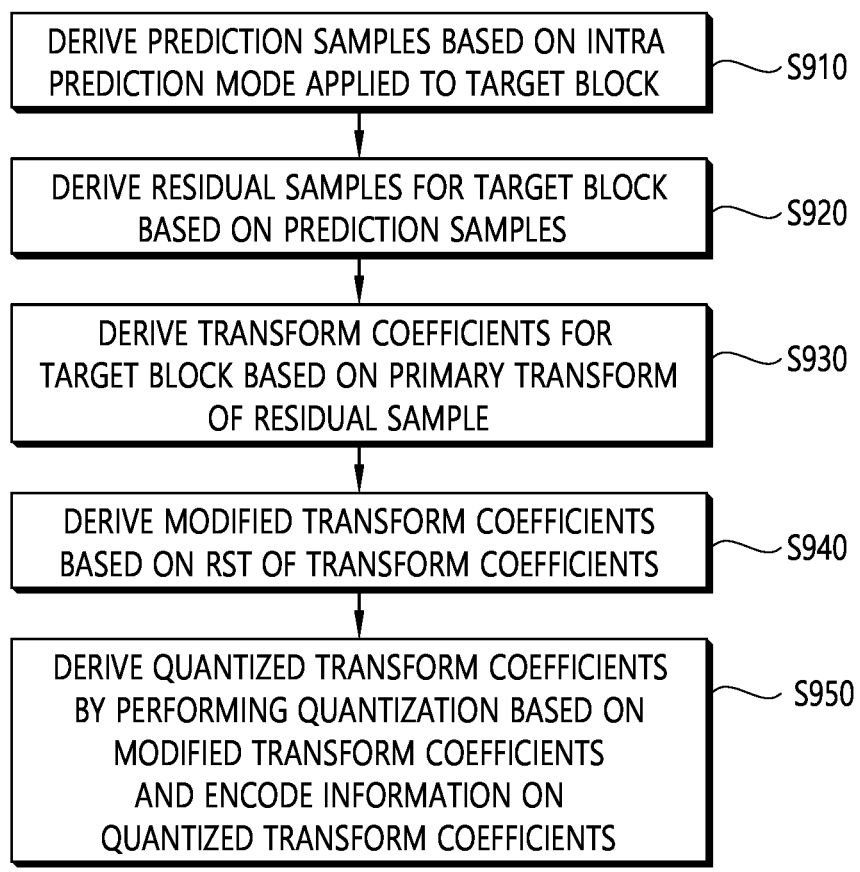
FIG. 9 is a flowchart illustrating an operation of an image encoding apparatus according to an embodiment of the present disclosure.

FIG. 9 is a flowchart illustrating an operation of a video encoding apparatus according to an embodiment of the present disclosure.

Each operation illustrated in FIG. 9 may be performed by the encoding apparatus 200 illustrated in FIG. 2. Specifically, S910 may be performed by the predictor 220 illustrated in FIG. 2, S820 may be performed by the subtractor 231 illustrated in FIGS. 2, S930 and S940 may be performed by the transformer 232 illustrated in FIG. 2, and S950 may be performed by the quantizer 233 and the entropy encoder 240 illustrated in FIG. 2. Operations according to S910 to S950 are based on some of contents described in FIG. 4 to FIG. 6. Therefore, a description of specific details overlapping with those explained above with reference to FIG. 4 to FIG. 6 will be omitted or will be made briefly.

The encoding apparatus 200 according to an embodiment may derive prediction samples based on an intra prediction mode applied to a target block (S910).

The encoding apparatus 200 according to an embodiment may derive residual samples for the target block (S920).

The encoding apparatus 200 according to an embodiment may derive transform coefficients for the target block based on primary transform of the residual sample (S930). The primary transform may be performed through a plurality of transform kernels, and the transform kernels may be selected based on the intra prediction mode.

The decoding apparatus 300 may perform a secondary transform or a non-separable transform, specifically an NSST, on the transform coefficients for the target block, in which case the NSST may be performed based on a reduced transform (RST) or without being based on the RST. When the NSST is performed based on the reduced transform, an operation according to S940 may be performed.

The encoding apparatus 200 according to an embodiment may derive modified transform coefficients for the target block based on the RST of the transform coefficients (S940). In an example, the RST may be performed based on a reduced transform matrix or a transform kernel matrix, and the reduced transform matrix may be a non-square matrix in which the number of rows is less than the number of columns.

In an embodiment, S940 may include determining whether a condition for applying the RST is satisfied, generating and encoding the transform index based on the determination, selecting a transform kernel, and applying the RST to the residual samples based on the selected transform kernel matrix and/or a reduced factor when the condition for applying the RST is satisfied. In this case, the size of the reduced transform kernel matrix may be determined based on the reduced factor.

The encoding apparatus 200 according to an embodiment may derive quantized transform coefficients by performing quantization based on the modified transform coefficients for the target block and may encode information on the quantized transform coefficients (S950).

Specifically, the encoding apparatus 200 may generate the information on the quantized transform coefficients and may encode the generated information on the quantized transform coefficients.

In an example, the information on the quantized transform coefficients may include at least one of information on whether the RST is applied, information on the reduced factor, information on a minimum transform size to which the RST is applied, and information on a maximum transform size to which the RST is applied.

Referring to S940, it may be identified that the transform coefficients for the target block are derived based on the RST of the residual samples. From the perspective of the size of the transform kernel matrix, since the size of a regular transform kernel matrix is N×N but the size of the reduced transform kernel matrix is reduced to R×N, it is possible to reduce memory usage in a case of performing the RST by an R/N ratio compared to that in a case of performing a regular transform. Further, using the reduced transform kernel matrix can reduce the number of multiplications (R×N) by the R/N ratio, compared to the number of multiplications N×N in a case of using the regular transform kernel matrix. In addition, since only R transform coefficients are derived when the RST is applied, the total number of transform coefficients for the target block may be reduced from N to R, compared to that in a case where N transform coefficients are derived when a regular transform is applied, thus reducing the amount of data transmitted by the encoding apparatus 200 to the decoding apparatus 300. That is, according to S940, the transform efficiency and coding efficiency of the encoding apparatus 320 may be increased through the RST.

Figure 10:
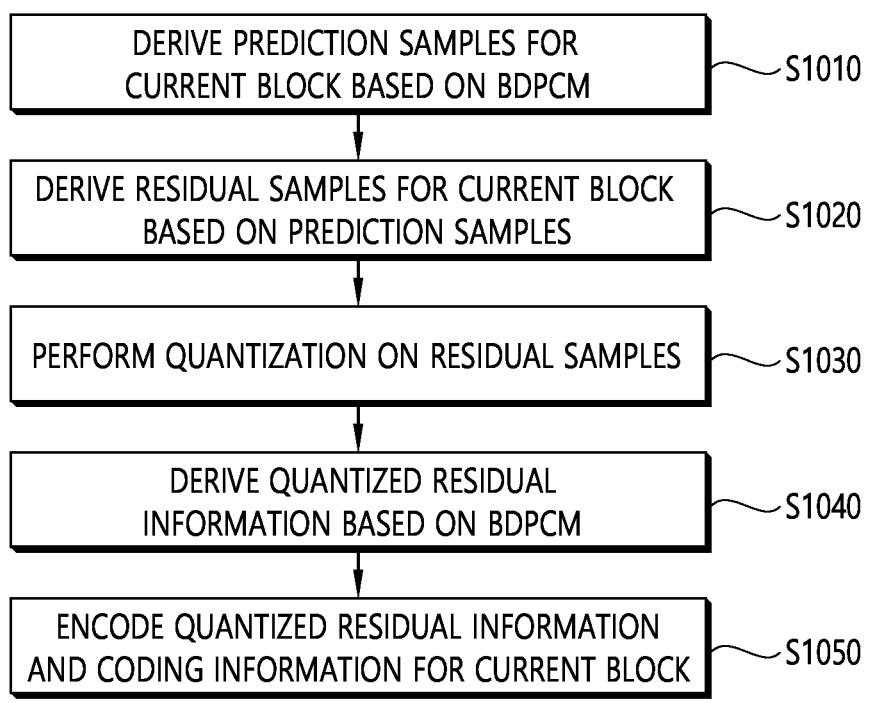
FIG. 10 is a control flowchart illustrating an image encoding method according to an embodiment of the present disclosure.

FIG. 10 is a control flowchart illustrating an image encoding method according to an embodiment of this document.

The encoding apparatus 200 may derive prediction samples for the current block based on the BDPCM (S1010).

The encoding apparatus 200 may derive intra prediction samples for the current block based on a specific direction in which the BDPCM is performed. The specific direction may be a vertical direction or a horizontal direction, and the prediction samples for the current block may be generated according to the intra prediction mode.

Meanwhile, the tree type of the current block may be divided into a single tree (SINGLE_TREE) or a dual tree (DUAL_TREE) depending on whether the luma block and the corresponding chroma block have an individual partition structure. When the chroma block has the same partition structure as the luma block, it may be represented as a single tree, and when the chroma component block has a partition structure different from that of the luma block, it may be represented as a dual tree. According to an example, the BDPCM may be individually applied to a luma block or a chroma block of the current block.

When the tree structure of the current block is the dual tree, the BDPCM can be applied to only one component block, and even when the current block has the single tree structure, the BDPCM can be applied to only one component block.

Alternatively, according to an example, the BDPCM may be applied only when the width of the current block is less than or equal to the first threshold and the height of the current block is less than or equal to the second threshold. The first threshold value and the second threshold value may be 32, and may be set to a maximum height or a maximum width of a transformation block in which transformation is performed.

The encoding apparatus 200 may derive residual samples for the current block based on the prediction samples (S1020) and perform quantization on the residual samples (S1030).

Then, the encoding apparatus 200 may derive quantized residual information based on the BDPCM (S1040).

The encoding apparatus 200 may derive a quantized residual sample of a specific line, and a difference value between a quantized residual sample of a previous vertical or horizontal line and a quantized residual sample of the specific line as quantized residual information. That is, the difference value of a quantized residual, not a normal residual, is generated as residual information, and may be derived based on Equation 9 or Equation 10.

The encoding apparatus 200 may encode the quantized residual information and the coding information for the current block (S1050).

The encoding device 200 may encode BDPCM information, transform skip flag information indicating whether transform skip is applied to the current block, transform index information for inverse secondary transform, that is, inverse non-separable transform, ie, the LFNST index or MTS index information indicating a transform kernel of the inverse primary transform.

The BDPCM information may include BDPCM flag information indicating whether the BDPCM is applied to the current block and direction information on a direction in which the BDPCM is performed.

When the BDPCM is applied to the current block, the BDPCM flag value may be encoded as 1, and when the BDPCM is not applied to the current block, the BDPCM flag value may be encoded as 0.

If the BDPCM is applied to the current block, the transform skip flag value may be inferred as 1 or encoded as 1. In addition, if the transform skip flag value is 1, the LFNST index value may be inferred as 0 or may not be encoded. That is, when the BDPCM is applied to the current block, the transform may not be applied to the current block.

Also, as described above, when the tree structure of the current block is a dual tree, the BDPCM can be applied to only one component block, and even when the current block has a single tree structure, the BDPCM can be applied to only one component block. In this case, the LFNST index may be encoded only for component blocks to which the BDPCM is not applied.

Direction information for the BDPCM may indicate a horizontal direction or a vertical direction.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

In addition, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Figure 11:
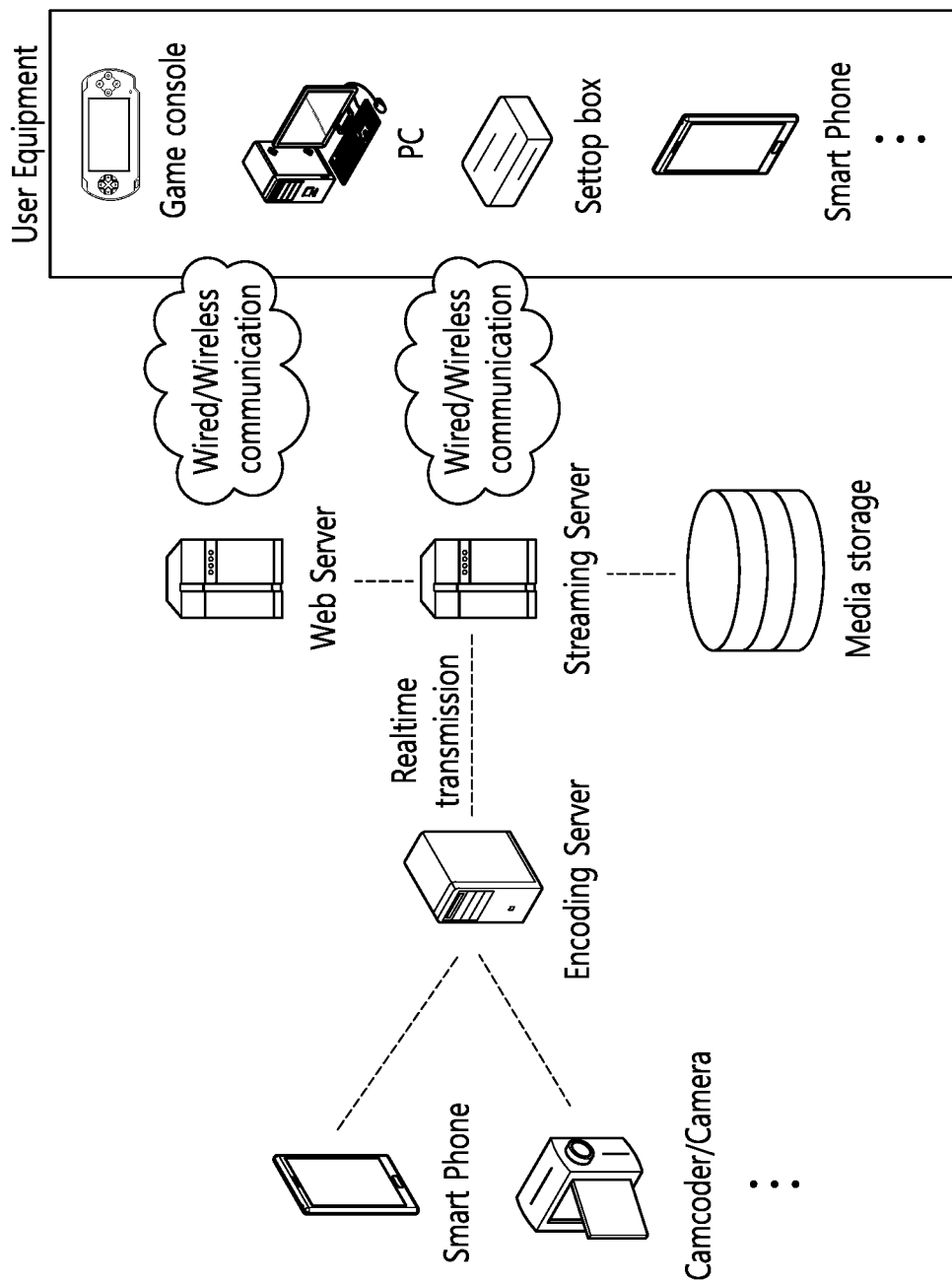
FIG. 11 illustrates the structure of a content streaming system to which the present disclosure is applied.

FIG. 11 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. An image decoding method performed by a decoding apparatus, the method comprising:
    deriving whether a BDPCM (Block-based Delta Pulse Code Modulation) is applied to a current block;
    deriving quantized transform coefficients for the current block based on the BDPCM;
    deriving transform coefficients by performing a dequantization on the quantized transform coefficients; and
    deriving residual samples based on the transform coefficients;
    wherein deriving whether the BDPCM is applied to the current block comprises determining a width of the current block is less than or equal to a first threshold and a height of the current block is less than or equal to a second threshold,
    wherein based on the width of the current block being less than or equal to the first threshold and the height of the current block being less than or equal to the second threshold, the BDPCM is applied to the current block,
    wherein based on the BDPCM being applied to the current block, an inverse non-separable transform is not applied to the transform coefficients, and
    wherein based on the BDPCM being applied to the current block, a value of a transform index for the inverse non-separable transform is inferred to be 0.

2. The image decoding method of claim 1, wherein the BDPCM is individually applied to a luma block of the current block or a chroma block of the current block,
    wherein based on the BDPCM being applied to the luma block, a transform index for the luma block is not received, and
    wherein based on the BDPCM being applied to the chroma block, a transform index for the chroma block is not received.

3. The image decoding method of claim 1, wherein when the BDPCM is applied to the current block, a value of a transform skip flag indicating whether a transform is skipped in the current block is inferred to be 1.

4. The image decoding method of claim 1, wherein the first threshold and the second threshold are 32.

5. The image decoding method of claim 1, wherein quantized transform coefficients are derived based on direction information on a direction in which the BDPCM is performed.

6. The image decoding method of claim 5, further comprising: performing an intra prediction on the current block based on the direction in which the BDPCM is performed.

7. The image decoding method of claim 6 wherein the direction information indicates a horizontal direction or a vertical direction.

8. An image encoding method performed by an image encoding apparatus, the method comprising:
    deriving prediction samples for a current block based on a BDPCM (Block-based Delta Pulse Code Modulation);
    deriving residual samples for the current block based on the prediction samples;
    performing quantization on the residual samples;
    deriving quantized residual information based on the BDPCM; and
    encoding the quantized residual information and flag information related to the BDPCM for the current block;
    wherein based on a width of the current block being less than or equal to a first threshold and a height of the current block being less than or equal to a second threshold, the flag information is encoded;
    wherein based on the BDPCM being applied to the current block, a non-separable transform is not applied to the current block, and
    wherein based on the BDPCM being applied to the current block, a transform index for the non-separable transform is not encoded.

9. The image encoding method of claim 8, wherein the BDPCM is individually applied to a luma block of the current block or a chroma block of the current block,
    wherein based on the BDPCM being applied to the luma block, a transform index for the luma block is not encoded, and
    wherein based on the BDPCM being applied to the chroma block, a transform index for the chroma block is not encoded.

10. The image encoding method of claim 8, wherein the first threshold and the second threshold are 32.

11. The image encoding method of claim 8, wherein intra prediction samples for the current block is derived based on a specific direction in which the BDPCM is performed, and
    wherein the quantization on the residual samples is performed based on the specific direction.

12. The image encoding method of claim 11, wherein the specific direction includes a horizontal direction or a vertical direction.

13. A non-transitory computer-readable digital storage medium storing a bitstream generated by a method, the method comprising:
    deriving prediction samples for a current block based on a BDPCM (Block-based Delta Pulse Code Modulation);
    deriving residual samples for the current block based on the prediction samples;
    performing quantization on the residual samples;
    deriving quantized residual information based on the BDPCM; and encoding the quantized residual information and flag information related to the BDPCM for the current block to generate the bitstream;

wherein based on a width of the current block being less than or equal to a first threshold and a height of the current block being less than or equal to a second threshold, the flag information is encoded;

wherein based on the BDPCM being applied to the current block, a non-separable transform is not applied to the current block, and wherein based on the BDPCM being applied to the current block, a transform index for the non-separable transform is not encoded.

\* \* \* \* \*